Nov. 17, 1953  G. DARRIEUS  2,659,243
APPARATUS FOR AUTOMATIC BALANCING OF ROTATING BODIES
Filed June 27, 1952  3 Sheets-Sheet 3

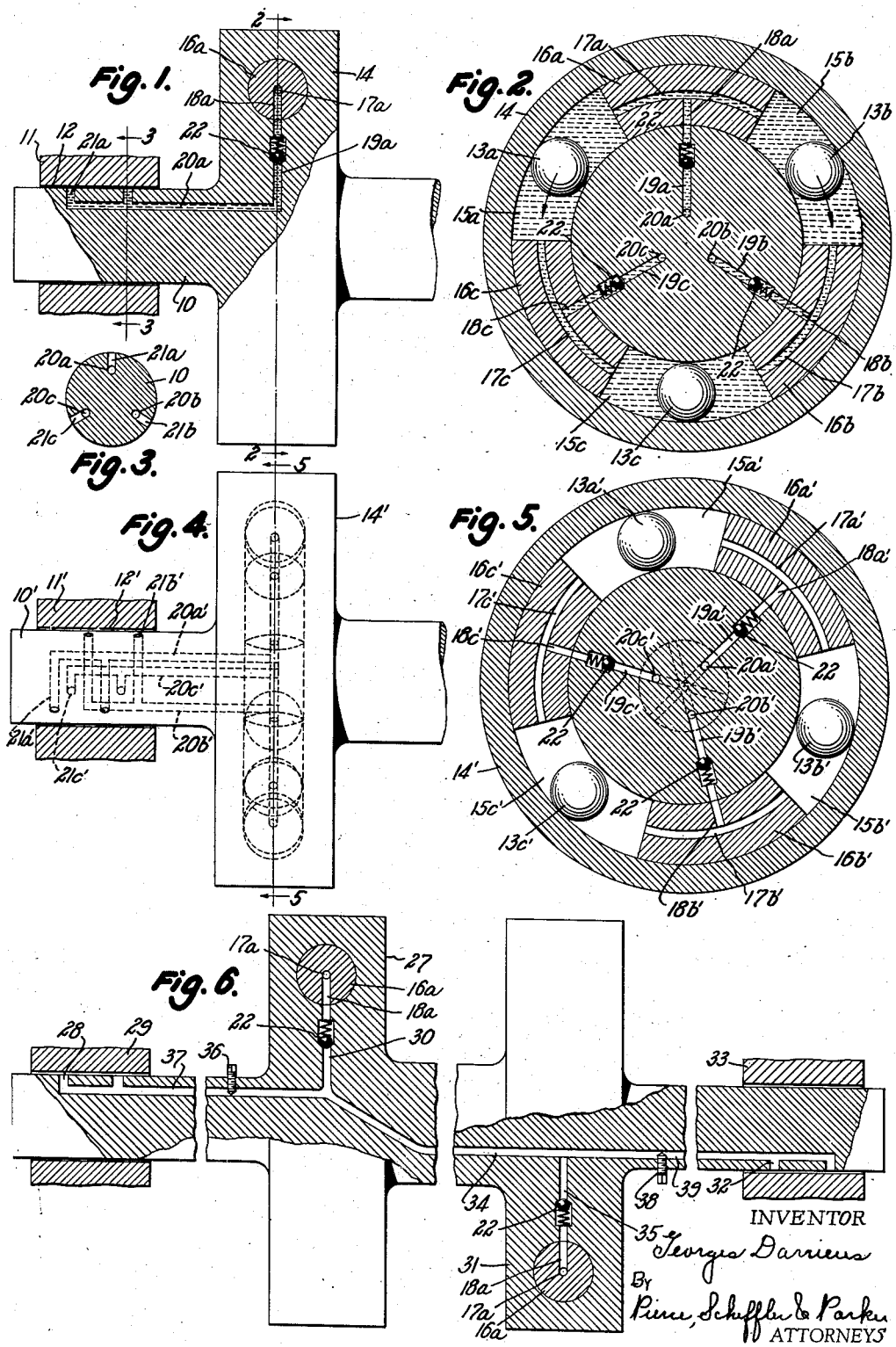

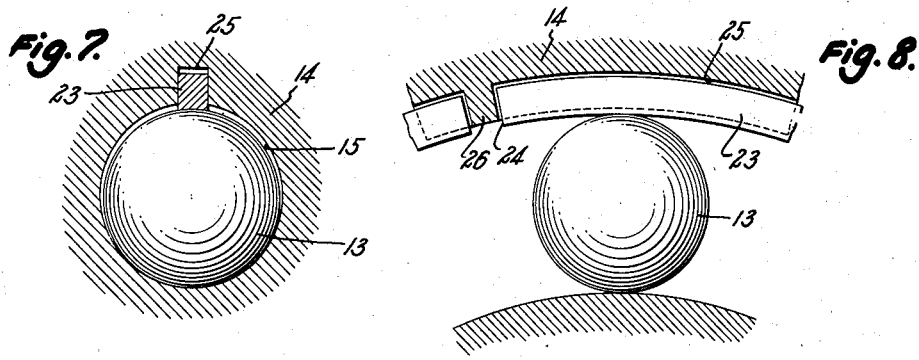
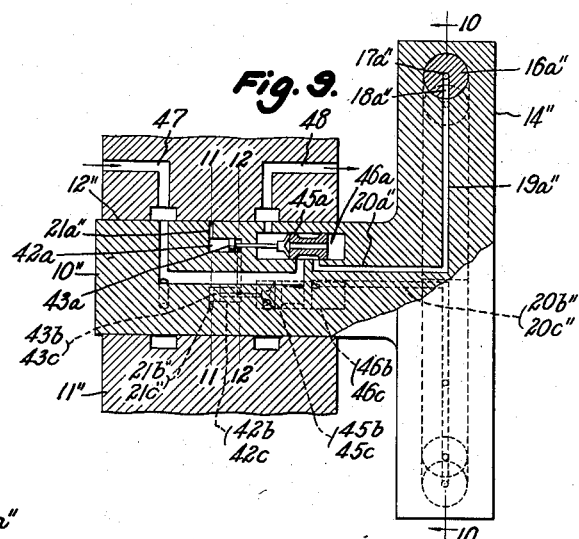
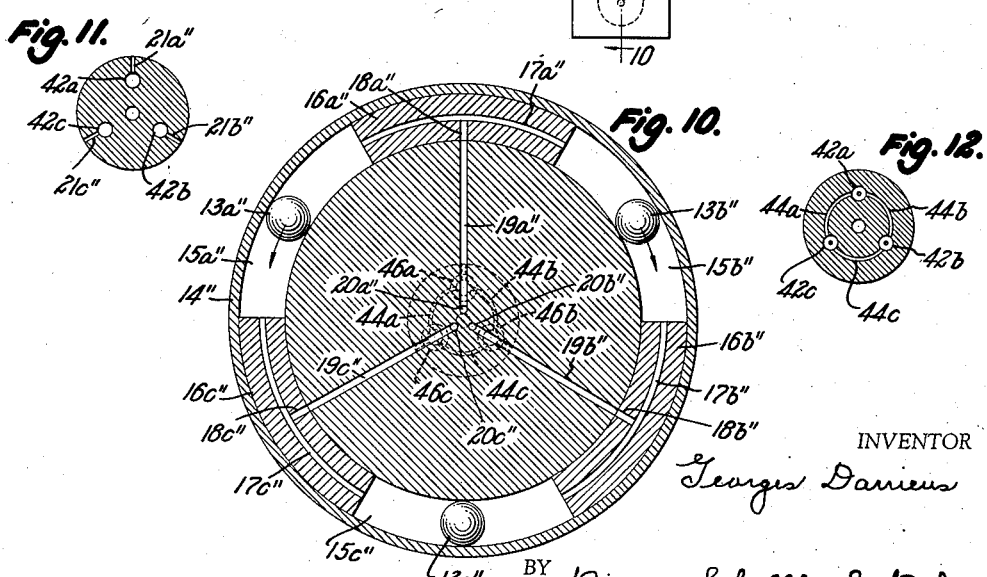

INVENTOR
Georges Darrieus
BY Pierre, Scheffler & Parker
ATTORNEYS

Patented Nov. 17, 1953

2,659,243

UNITED STATES PATENT OFFICE

2,659,243

APPARATUS FOR AUTOMATIC BALANCING OF ROTATING BODIES

Georges Darrieus, Houilles, France, assignor to Aktiengesellschaft Brown, Boveri & Cie., Baden, Switzerland, a joint-stock company Application June 27, 1952, Serial No. 296,023

Claims priority, application France July 5, 1951

14 Claims. (Cl. 74—573)

The present invention relates to apparatus for static and dynamic balancing of rotary machine parts and particularly to those classes of machines such as for example, centrifuges, grinding machines and turbomachines not stationarily operated, and the like wherein operating conditions involve unpredictable displacement of the rotating masses.

Because of the unpredictable nature of the imbalance, the balancing systems have to be designed in such manner that the imbalance will be compensated out in an automatic manner whenever and at whatever place or places it may occur.

Among the systems already proposed to effect this result are those which make use of a plurality of balls positioned symmetrically about the shaft of the machine and which are so arranged as to be free for movement along an arcuate path concentric with the shaft. Rings of sufficiently great mass placed on the shaft have also been employed to effect automatic rebalance and operate on the same principle as the balls, that is to say by an automatic change in position along the arcuate path concentric with the shaft axis. Devices of these types are capable of compensating every kind of imbalance both as to direction and magnitude, but with respect to the latter, only within certain limits which depend upon the mass of the balls or rings.

Moreover, such devices are not without other inherent disadvantages. For one thing they are applicable only in cases where the machine operates at rotary speeds in excess of the critical speed. By critical speed is meant that number of revolutions per unit of time which corresponds to the natural or resonant frequency of the mass which is being rotated. A condition for its being carried out therefore is a sufficiently flexible installation of the rotating mass, whether permanently, as for example in pendulum centrifuges with a suspended vessel, or temporarily, as in grinding machines, in which the normal rigid installation of the rotating mass is made more or less flexible in more or less quickly succeeding units of time between the work periods whenever the necessity for a new balancing arises.

Another disadvantage inherent in the prior art automatic rebalancers of the movable ball or roller type is an inability to respond fully and accurately to correct a condition of imbalance. This arises from the fact that the change in ball or roller position to bring about a rebalance is made dependent only upon the very slight inclination of the rolling path brought about by the imbalance. Consequently the presence of any roughness along the path or friction can easily lower the response sensitivity of the balancer.

In accordance with the present invention, the foregoing disadvantages are all eliminated and the inventive concept which makes this possible resides in the novel use of revolving reactive centrifugal forces in the bearings of the rotating member which are created by and vary in proportion to the magnitude of any imbalance in the member. Such forces do not exist when the rotating member is perfectly balanced and consequently the magnitude of such reactive force may be taken as a measure of the imbalance to be compensated out. Moreover, as will become more apparent in a later part of this specification, the improved balancer device can be used on rotary members regardless of the speed at which these members are operated. Thus it matters not that the member rotates below or above its critical speed and hence the invention permits substantially rigid installations of the rotary members as distinguished from the previously discussed and more undesirable flexible installations formerly necessary when the rotary member was required to rotate at speeds higher than its critical velocity.

According to the invention, the revolving reactive forces generated in the bearings as a result of any imbalance bring about corresponding changes in the pressure of the lubricating medium utilized in the bearing, and these pressure changes are then utilized to effect positive and corresponding imbalance compensating changes in the positions of a plurality of symmetrically positioned balancing members such as balls or rollers arranged for displacement along an arcuate path concentric with the shaft axis of the rotating member. The balancer is entirely automatic in character, has a very high order of response sensitivity and any imbalance is compensated out as soon as the slightest revolving centrifugal force of reaction occurs in the bearings.

In the accompanying drawings, several different embodiments of the invention have been shown but these are to be viewed as typical rather than limitative of the structural forms possible within the scope of the inventive concept defined in the appended claims.

With reference now to the drawings:

Fig. 1 is a longitudinal view partly in central section at one end bearing portion of the shaft element of a rotary member containing the axis of rotation illustrating in somewhat diagrammatic form one embodiment of the invention designed for automatic rebalancing of members which rotate at speeds below their critical angular velocity;

Figure 2 is a transverse section through the automatic balancer element taken on line 2—2 of Fig. 1;

Fig. 3 is a transverse section on line 3—3 of Fig. 1;

Fig. 4 is a view similar to Fig. 1 showing an embodiment of the invention to be utilized when the rotary member to be balanced automatically is to be driven at speeds in excess of its critical angular velocity;

Fig. 5 is a view similar to Fig. 2 taken on line 5—5 of Fig. 4;

Fig. 6 is a longitudinal view partly in central section through the shaft element of a rotary body to be balanced automatically showing an embodiment of the invention to be used when the balancer elements cannot be located near the end bearings of the shaft as in Figs. 1-5;

Fig. 7 is a transverse fragmentary view showing an alternative refinement for the balancer construction shown in any of the previous views by which the ball elements are maintained against displacement when the shaft is at rest;

Fig. 8 is another transverse view similar to Fig. 7 but taken in plane normal thereto;

Fig. 9 is a central longitudinal section similar to Fig. 1 showing a modified embodiment of the invention wherein are servomotor means are employed to translate pressure changes in the bearing reflective of imbalance into corresponding displacements of the ball elements in the balancer;

Figure 13:
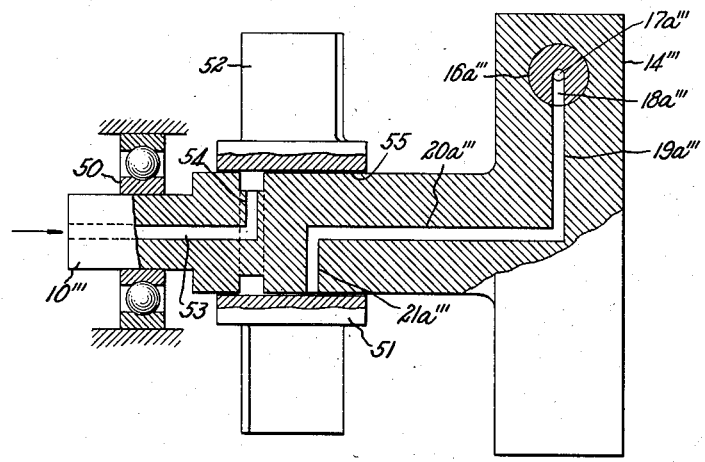
Figure 14:
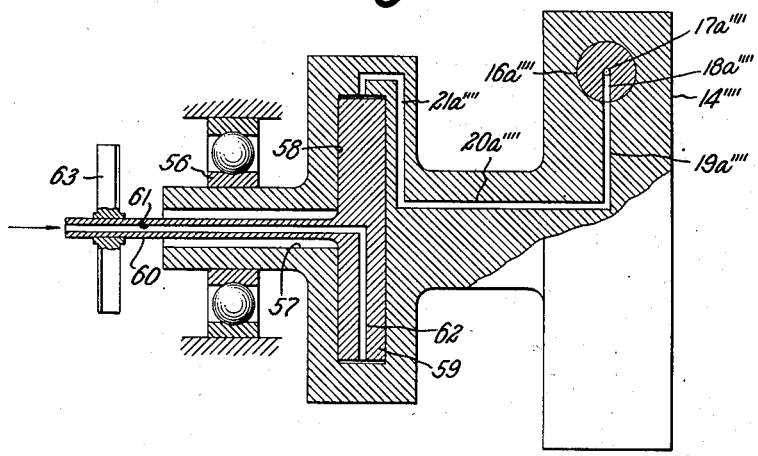

Figs. 10, 11 and 12 are transverse sections taken on lines 10—10, 11—11 and 12—12, respectively of Fig. 9;

Fig. 13 is a central longitudinal section similar to Fig. 1 showing still a different embodiment of the invention suited particularly to constructions wherein ball, roller, or other types of antifriction bearings are employed for mounting the shaft ends; and Fig. 14 is a central longitudinal section similar to Fig. 13 illustrating another embodiment of the invention suitable for shafts mounted in antifriction bearings.

Referring now more particularly to Figs. 1-3, numeral 10 designates one end portion of the shaft element of a rotary member (not illustrated) and which is mounted in a stationary bearing sleeve 11. Lubrication for the portion of shaft 10 within the bearing sleeve 11 is provided by a thin film of oil 12 maintained therebetween and which is supplied to the sleeve in any conventional manner not shown. The automatic balancer is comprised of a plurality of balancing masses in the form of rolling bodies such as the balls 13a, 13b, 13c contained within a cylindrical body member 14 made rotatable with the shaft. The balls are disposed symmetrically about the shaft axis and are arranged for movement along an arcuate rolling path concentric with the axis of shaft 10 and which is constituted by an annular space provided in the body 14, and which is divided circumferentially into three separate sections 15a, 15b, 15c each containing one of the balls by means of identical arcuate inserts 16a, 16b, 16c circular in transverse section and which are so arranged that the three space sections 15a, 15b, 15c are of equal length.

Insert 16a is provided with a longitudinal bore 17a extending from one end to the other so as to communicate with the spaces or chambers 15a, 15b, adjacent such ends and a transverse bore 18a extending radially inward from bore 17a, the bore 18a being in alignment and communicative with a radially extending bore 19a in the body 14. At its innermost end, bore 19a communicates with another bore 20a extending longitudinally through the body 14 and shaft 10 in the direction of bearing sleeve 11. Bore 20a in turn communicates with a pair of radially arranged, axially displaced bores 21a extending radially outward in the shaft to that portion of the surface of the latter which is situated within the bearing sleeve 11. Moreover, in this embodiment, which is adapted for use on apparatus designed to run at speeds below its critical speed, it is necessary that the bores 21a be in radial alignment and on the same side of the shaft as the bore 19a associated therewith since any revolving centrifugal force created in the shaft 10 because of an overbalance will be directed toward the location of such overbalance.

In a similar manner, the two other arcuate inserts 16b, 16c are provided with longitudinal bores 17b, 17c, transverse bores 18b, 18c, and bores 19b, 19c and 20b, 20c lead to other pairs of bores 21b, 21c in the shaft which are in radial alignment with and extend in the same direction as their associated bores 19b, 19c. Being symmetrically disposed, bores 18a, 18b and 18c are spaced 120° apart and the same is true for the other radial bores described.

Assuming a condition of overbalance to exist in the rotating member, the pressure in the oil film 12 between sleeve 11 and the surface of shaft 10 in a radial direction at the mouth of each of the bores 21 will have as a general rule a first and varying pressure component which stems from external forces acting on the rotating body (for example its weight) and is fixed in its spatial direction, and a second pressure component constant in time but variable along the periphery, which stems from the centrifugal force attributable to the overbalance and which revolves at a velocity synchronous with that of the shaft 10. The first pressure component, also of a frequency equal to that of the shaft rotation, does not enter into consideration because of the viscosity and inertia of the oil and of the balancing masses 13a—13c. The constant component is however reflected by a change in pressure in the oil film 12, the pressure being greatest in the plane and direction of the overbalance and smallest in the opposite direction. Thus under the influence of these momentary differences in pressure, the bores whose mouths lie in the general direction of the overbalance such as bores 21a for example, derive continuously from the oil film 12 of the bearing a little of the oil while the opposite bores 21b, 21c at the side away from the overbalance return a corresponding amount of oil to the film. The surface of the balls 13a—13c have a minimum running clearance with the walls defining the annular chambers 15a, 15b, 15c and consequently the balls are displaced in their chambers by the oil in the manner of pistons. The direction and amplitude of the ball displacement will automatically be such as to gradually compensate for the overbalance until the rotating member is once again in a state of dynamic balance. Thus for example should the overbalance be in the direction of the bores 21a shown in Fig. 1, oil under pressure will flow through bores 20a, 19a, 18a, and 17a to chambers 15a, 15b causing displacement of the balls 13a, 13b therein in the direction indicated by the arrows away from the direction of overbalance. Because of the lower oil pressures at the mouths of bores 21b, 21c, oil displaced by movement of balls 13a, 13b is able to return to such bores from the chambers 15a, 15b through bores 17b, 17c, 18b, 18c, 19b, 19c and 20b, 20c.

Another balance organization like that shown in Figs. 1–2 is arranged at the opposite end of the rotary body adjacent the bearing at such end thus providing a complete static and dynamic balance for the body.

In the embodiment shown in Figs. 1 and 2 and similar embodiments which will be later referred to wherein the pressure developed for displacement of the balls is limited to that developed only at the oil film in the bearing, it is of course quite possible that some oil may leak out of the chambers 15a, 15b, 15c when the rotatable body is at rest thus permitting the balls to shift their positions. This would be most undesirable since upon restarting, the body would no longer be balanced and a new balance would be delayed until the balls had moved the necessary distance along their rolling path. To prevent the balls from shifting their position while the rotatable body is not rotating, it will ordinarily be sufficient in the case of small diametered bodies to make the mouths of the bores 21a–21c so small that the capillary forces counteract the hydrostatic pressures caused by the differences in the heights of the oil levels in the bores and by the weight of the balancing masses.

For larger diametered rotatable bodies, positive means may be employed for locking the balancing masses against displacement. Thus in Fig. 1 and Fig. 2 and other similar embodiments, it will be seen that spring loaded, ball type check valves 22 are placed in each of the bores 19a, 19b and 19c. The springs load the ball members of the check valves in a radially inward direction and hence the valves will close automatically to block oil flow therethrough whenever the centrifugal forces developed by rotation of the body fall below the closing forces of the springs.

A somewhat different type of device for preventing displacement of the balls 13 when the rotatable body is at rest is shown in Figs. 7 and 8. In this embodiment, the ball lock consists of a braking device acting directly on the balls in the form of an elastic ring 23 interrupted to establish a gap at 24 and which is disposed in a circular groove 25 concentric with the bearing shaft axis in the body 14 of the balancer, the groove 25 being located at the radially outward side of the balls 13. An abutment 26 separates the two ends of the ring 23 at the break 24. The ring ends have adequate play with respect to the abutment so as to be able to open freely under the influence of centrifugal forces developed by rotation and the abutment insures positive rotation of the ring 23 as the body member 14 rotates. When the body is at rest, split ring 23 will of course tend to move radially inward at all points along its periphery until contact is established with the surface of the balls 13 thus locking the latter against displacement since the ring 23 itself cannot rotate relative to the body 14. However, when body 14 is rotated, the centrifugal force acting radially outward at all points along the periphery of ring 23 will exceed the inherent radially inward force of the ring causing the ring to expand and release its contact with the ball surface. The balls are then free to take up a new position of balance whenever the necessity arises.

Figs. 4 and 5 illustrate an embodiment of the invention used when the body to be balanced is driven at a frequency of rotation exceeding the natural frequency of the body. In view of the similarity in construction to Figs. 1 and 2, like components in the two embodiments have been given the same reference numerals but with primes added to the embodiment of Figs. 3 and 4. When the frequency of rotation exceeds the natural frequency of the body the revolving centrifugal force acting on the shaft at the bearing has a direction diametrically opposite that of the overbalance. Hence each of the radial bores 19a'–19c' is displaced 180° away from the bores 21a'–21c', respectively associated therewith. Otherwise the arrangement and operation are the same as in Figs. 1 and 2.

As already explained, the complete static and dynamic balance requires two balancers of the type described situated in two different planes, for example in the vicinity of the shaft ends each of which is connected as a rule with the nearest situated bearing pin. If, as an exception, the two planes of balancing have to be located at relatively great distances from the bearings such as is depicted in Fig. 6, it is advantageous to provide each balancer with pressure oil not only from the bearing nearest thereto but also from the bearing supplying pressure oil to the other balancer. Accordingly the balancer 27 to the left includes three ball chambers as in Figs. 1 and 2 and with the three sets of radial bores 28 in the shaft leading to the oil film in bearing sleeve 29 in radial alignment with and on the same side of the shaft as the three bores 30 in balancer body 27 leading to the ball chambers which is also the arrangement of Figs. 1 and 2. The balancer 31 on the right is constructed in the same manner as balancer 27 but displaced relatively thereto so that the three sets of radial bores 32 leading to the shaft bearing sleeve 33 are diametrically opposite the three sets of radial bores 28 at the opposite end of the shaft. It will also be noted that three bores 34 extend longitudinally through the rotor body and interconnect the bores 35 and 30 and hence also the bores 28 and 32. In the interest of simplicity however only one of the three bores 34 has been illustrated as is also the case with respect to bores 28, 30, 32 and 35. An adjustable valve represented diagrammatically as a screw 36 is inserted in each of the bores 37 between bores 28 and 30 to regulate oil flow therethrough and other valves 38 are similarly inserted in bores 39 between bores 32 and 35.

With the arrangement thus described, rebalancing of the body becomes more rapid and moreover each balancer is maintained non-responsive to such unbalance as the other balancer is supposed to compensate. That is to say, an overbalance occurring in the plane of one balancer, for example, in the balancer 31 on the right side produces no reaction in the other balancer 27 and vice versa. This can be explained in the following manner. If it be assumed that the unbalance to be compensated lies in the plane of balancer 31, the rotating centrifugal force attributable thereto will result in an increase in oil pressure at the mouths of bores 32 in bearing 33 and a decrease in oil pressure at the mouths of bores 28 in bearing 29. The relative openings in the valves 36, 38 and the drops in oil pressure which they establish in the communicating bores 37, 34 and 39 are so regulated that the increased pressure at the mouths of bores 32 and the reduced pressure at the mouths of bores 28 develop a pressure gradient along the bores 39, 34, 37 such as will result only in a continuous flow of oil from bores 32 towards bores 28 without any diversion of oil into the bores 30 of the left balancer 27 nor displacement of the balancing balls therein. The increased oil pressure at bores 32 is however accompanied by a flow of oil radially outward through bores 35 in the right balancer 31 and effects the necessary displacement of the balancing balls to compensate for the unbalance.

In all embodiments so far described, displacement of the balancing balls is effected directly as a function of the oil quantity removed from the oil film in the bearing sleeves and which passes directly to the annular spaces 15a–15c. While this is a practical arrangement for certain applications, it may be advisable in cases where the condition of balance is subject to sudden changes, such as in centrifuges, to insert an oil servomotor into the system in order to effect rebalance more quickly. One practical arrangement of this kind is illustrated in Figs. 9-12.

From Fig. 10 it will be evident that the arrangement of the balls, inserts, spaces and bores in the balancer body is the same as in Figs. 1-2 and hence corresponding elements have been assigned the same reference numerals but with double primes applied thereto in order to distinguish one from the other. However, the bores 21a″–21c″ at the bearing 11″ instead of being connected directly to bores 20a″–20c″ as in Figs. 1-2 lead respectively to one end of the cylinder elements 42a, 42b, 42c of pilot valves, the pistons of which are designated by numerals 43a, 43b, 43c. The opposite ends of the cylinders 42a–42c are all interconnected by means of bores 44a–44c as shown in Fig. 12.

Pistons 43a–43c are connected respectively to pistons 45a, 45b, 45c having longitudinal bores therethrough and which operate in cylinders 46a, 46b, 46c. These latter are known as "D" valves and the position of the piston in the cylinder determines the amount of pressure oil which will be allowed to flow from the supply source to the balancer. The positions taken by the parts as shown in these views, and assuming rotation at a speed below the critical speed, are indicative of an increased pressure in the oil film 12″ at the mouth of bore 21a″ and a decreased pressure at the mouths of bores 21b″, 21c″. Consequently piston 43a has been moved to the right and pistons 43b, 43c to the left, movement of the latter being produced by discharge of oil from the right end of cylinder 42a through bores 44a, 44b into the right end of cylinders 42b, 42c. Piston 45a will likewise have moved to the right and pistons 45b, 45c to the left. Oil under pressure from a suitable source coming into the bearing through bore 47 is thus free to pass from the latter into bore 20a″, these two bores having been placed in communication by the annular recess in piston 45a, and thence through bore 19a″ into one end of the balancing chambers 15a″, 15b″ to effect the necessary repositioning of balls 13a″, 13b″ in the direction denoted by the arrows. At the same time, oil will be returned from the other end of chambers 15a″, 15b″ through bores 19b″, 19c″, 20b″ and 20c″ into cylinders 46b, 46c and flow from the latter through the longitudinal bores in pistons 45b, 45c and thence into the outlet line 48 for the pressure oil. Thus in the embodiment shown in Figs. 9-12, the oil pressure available for actuating the balancing masses is that of the extraneous source and the pressure of the oil film at the bearing is used only to actuate the pilot valves which in turn control, in a proportional manner, the flow of oil into and out of the balancer from the source of greater pressure and also greater flow.

In all of the embodiments so far described, it has been assumed that the sleeve bearings 11 carry the entire weight of the rotating body. However, it may well be desirable to journal the shaft ends of the body in anti-friction bearings such as those of the ball or roller type in which event the body must be provided with other devices capable of developing the change in oil pressure indicative of imbalance. One suitable arrangement for effecting the desired result is shown in Fig. 13. In this view, the balancer is identical in many respects with that shown in Figs. 4 and 5, and like parts have hence been assigned like reference numerals but with triple primes added for purposes of distinction. The shaft end 10‴ is supported by means of a ball bearing 50. In order to develop the necessary fluid pressures for actuating the balancing masses, shaft 10‴ has mounted thereon a "false" bearing sleeve 51 having radially extending vanes 52 thereon. Oil under pressure is supplied from a suitable source through a longitudinal bore 53 into the interior of shaft 10‴ and thence passes radially outward through bore 54 to develop an oil film 55 between the shaft surface and the surface of the bearing sleeve. When shaft 10‴ rotates, the resistance to rotation presented by the vanes 52 thus develops a slip between the bearing sleeve and shaft with the result that the sleeve 51 rotates in the same direction as shaft 10‴ but at a slower speed. Under these conditions, distribution of the oil film 55 along the periphery of the sleeve 51 is uniform and any unbalance in the body will set up the same type of pressure change in the film 55 as in the film 12 of the embodiment according to Figs. 1 and 2. If desired, the "false" bearing sleeve 51 can be maintained stationary but the arrangement illustrated is preferred since it reduces the losses incident to liquid friction. It will be noted that as in Figs. 4 and 5, bore 21a‴ although radially aligned with bore 19a‴ extends in the opposite direction, this for the reason that the reaction of the "false" bearing sleeve 51 is now produced predominately by the inertia instead of being of an elastic nature as in the case of the Fig. 1 embodiment, or as it can become again beyond a certain critical velocity when the inertia is compensated for by a more or less stiff return of the bearings by means of springs.

Another practical embodiment of the invention when the rotatable body is mounted in antifriction bearings is shown in Fig. 14. As in previous embodiments corresponding components have been assigned like reference numerals but with quadruple primes added. Numeral 56 designates the ball bearing supporting the shaft end 10⁗. The latter is provided with a longitudinal bore 57 extending inwardly from the end of the shaft to a cylindrical recess 58 containing a cylindrical disk 59 the diameter of which is slightly less than that of recess 58. The disk 59 has a minimum of lateral play in the recess 58 but yet is able to slip rotationally with respect to the rotatable body. Disk 59 is provided with an axial portion 60 extending to the exterior of the shaft through bore 57 and fan blades 63 mounted thereon so as to develop a rotational slip between the rotatable body and the disk 59. Oil under pressure is supplied through longitudinal bore 61 in the axially extending portion 60 and thence through a radial bore 62 to the annular space between the periphery of the disk 59 and that of the recess 58.

As long as the rotatable body remains balanced, disk 59 remains centered with respect to the shaft axis and all ball chambers in the balancer will receive the same oil pressure. If however an overbalance should arise, the disk 59 will shift in the direction of overbalance thus raising the pressure of the oil film at the side of the overbalance and causing the balancing balls to shift until dynamic balance is restored.

The novel automatic balancing device which has been described is not limited to use of a liquid of relative high viscosity, e. g. lubricating oil. Other fluids such as water or air can be substituted for the oil, particularly in those embodiments wherein the rotatable body is journalled in anti-friction bearings in which "false" bearings are used and which do not require for the production of the requisite moderate pressures such exceptionally small clearances as is the case with bearings upon which loads are imposed.

I claim:

1. Apparatus for automatically balancing a body mounted for rotation about its axis comprising a balancer member containing a plurality of arcuate chambers positioned symmetrically and concentrically about the axis of said body, each said chamber having a solid balancing mass therein movable along the arcuate path defined by the chamber, means for developing fluid pressure differentials about the axis of rotation of said body proportional to any unbalance in said body, and means applying said pressure differentials to said balancing masses at opposite sides thereof in said chambers to effect displacement of said masses in a direction restorative of balance.

2. Apparatus for automatic balancing of a rotatable body as defined in claim 1 and which further includes means responsive to centrifugal force for locking said balancing masses against displacement when said body is in a state of rest and unlocking said masses when said body is rotated.

3. Apparatus as defined in claim 2 wherein said locking means is comprised of a check valve located in radial bores leading to said chambers.

4. Apparatus as defined in claim 2 wherein said locking means is comprised of a resilient split ring expandable and contractible to release or engage respectively the surface of said balancing masses.

5. Apparatus for automatically balancing a body mounted for rotation about its axis comprising a sleeve surrounding a shaft portion of the body, means providing a fluid film between the sleeve and shaft, a balancer member containing a plurality of arcuate chambers positioned symmetrically and concentrically about the axis of said body, each said chamber having a solid balancing mass therein movable along the arcuate path defined by the chamber, and means placing said chambers at the sides opposite the masses therein in communication respectively with said fluid film at different points about the film periphery whereby the pressure differentials effected around the periphery of the film as a result of any unbalance in said body produce a compensating displacement of said balancing masses restoring said body to a balanced state.

6. Apparatus for automatically balancing a rotatable body as defined in claim 5 wherein each chamber communicates with said fluid film on the same side of the body axis as lies said chamber.

7. Apparatus for automatically balancing a rotatable body as defined in claim 5 wherein each chamber communicates with said fluid film on the side of the body axis opposite to that on which the chamber lies.

8. Apparatus for automatically balancing a rotatable body as defined in claim 5 including a balancer of the type defined associated with the shaft at each end of the body and wherein the respective fluid films are in communication with each other.

9. Apparatus for automatically balancing a rotatable body as defined in claim 5 wherein said body is journalled in anti-friction bearings and said sleeve constitutes a "false" bearing.

10. Apparatus for automatically balancing a rotatable body as defined in claim 9 wherein said sleeve is provided with vanes to effect a rotational slip between the sleeve and rotatable body.

11. Apparatus for automatically balancing a rotatable body mounted for rotation about its axis comprising a sleeve surrounding a shaft portion of the body, means providing a fluid film between said sleeve and shaft, a balancer member containing a plurality of arcuate chambers positioned symmetrically and concentrically about the axis of said body, each said chamber having a solid balancing mass therein movable along the arcuate path defined by the chamber, and servo motor means controlling flow of a fluid under pressure to said chambers, said servo motor means being responsive to and controlled by pressure variations effected at different points about the periphery in said fluid film as a result of any unbalance in said body.

12. Apparatus for automatically balancing a rotatable body mounted by anti-friction bearings for rotation about its axis comprising a balancer member containing a plurality of arcuate chambers positioned symmetrically and concentrically about the axis of said body, each said chamber having a solid balancing mass therein movable along the arcuate path defined by the chamber, means providing a cylindrical recess concentric with the axis of said body, a cylindrical disk in said recess, said disk having a diameter slightly less than that of said recess, and being rotatable relative to said body, means maintaining a film of fluid between the periphery of said disk and said recess, and means placing said chambers at the sides opposite the masses therein in communication respectively with said fluid film at different points about the circumference of said cylindrical recess.

13. Apparatus for automatically balancing a rotatable body as defined in claim 12 wherein said fluid film is supplied from a source under pressure.

14. Apparatus for automatically balancing a rotatable body as defined in claim 12 wherein said disk includes an axial portion extending to the exterior of said body, said axial portion being provided with vanes to effect a rotational slip between said disk and body.

GEORGES DARRIEUS.

References Cited in the file of this patent

UNITED STATES PATENTS

| Number | Name | Date |
|---|---|---|
| 1,159,052 | Leblanc | Nov. 2, 1915 |
| 1,314,005 | Louden | Aug. 26, 1919 |
| 1,967,163 | Thearle | July 17, 1934 |
| 2,186,199 | Martin | Jan. 9, 1940 |
| 2,331,756 | Zobel | Oct. 12, 1943 |
| 2,461,643 | Hemmeter | Feb. 15, 1949 |